R. W. BURNETT.
MEANS FOR HOLDING TRAIN PIPES AND ANGLE COCKS.
APPLICATION FILED JAN. 29, 1919.
1,369,617.
Patented Feb. 22, 1921.
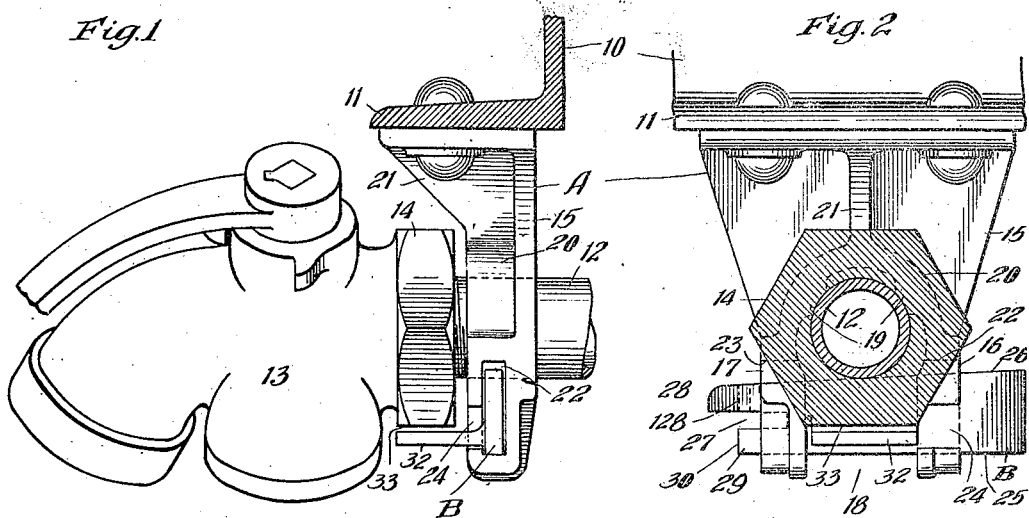
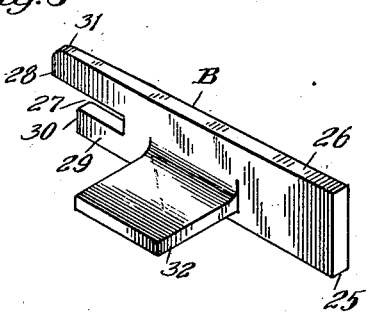
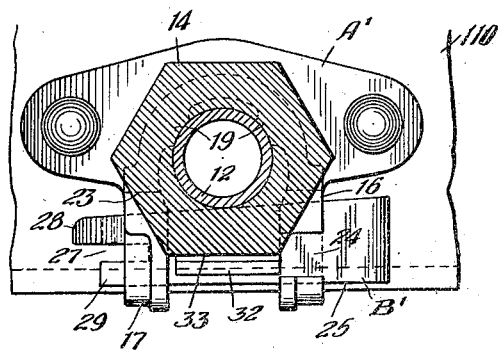
INVENTOR.
Richard W. Burnett
BY George J. Haight
his ATTORNEY

UNITED STATES PATENT OFFICE.

RICHARD WEBB BURNETT, OF CHICAGO, ILLINOIS.

MEANS FOR HOLDING TRAIN-PIPES AND ANGLE-COCKS.

1,369,617. Specification of Letters Patent. Patented Feb. 22, 1921.

Application filed January 29, 1919. Serial No. 273,758.

*To all whom it may concern:*

Be it known that I, RICHARD WEBB BURNETT, a citizen of the United States, residing at Chicago, in the county of Cook and State of Illinois, have invented a certain new and useful Improvement in Means for Holding Train-Pipes and Angle-Cocks, of which the following is a full, clear, concise, and exact description, reference being had to the accompanying drawings, forming a part of this specification.

This invention relates to improvements in means for holding train pipes and angle cocks.

In the construction and operation of railroad cars, the terminal of the air line or train pipe is located at a point fixed by rules of the Master Car Builder's Association, and furthermore, the angle cock applied to the end of the train pipe must be positioned and held at a definite angle, 30° from the vertical. These angle cocks are of standard construction and have a hexagonal nut formed integral with the cock proper, the relation of the cock proper and the nut being such that, when the cock is placed at the requisite angle, 30° to the vertical, two of the upper and lower faces of the nut extend horizontally and it has been the practive to provide a fixed lug or projection on a bracket or the end sill of the car to engage one or more faces of the nut so as to prevent the latter from turning after the parts are properly assembled.

In many constructions the train pipe is disposed below the lower edge of the end sill so that anchoring brackets may be employed which are provided with a downwardly opening slot. With these constructions, it is possible to apply the angle cock to the end of the pipe, under some conditions, before the pipe is slipped up into the bracket and consequently little difficulty is experienced in properly holding the nut of the angle cock against turning by engaging it with some lug fixed with respect to the anchoring bracket. There are, however, numerous constructions in service which require a train pipe to pass through a perforation or hole in the end sill so that the angle cock cannot be applied to the end of the pipe until after the pipe has been inserted through the hole in the sill. With these constructions, it is evident that it would be impossible to apply the angle cock were there a fixed lug or projection on the anchor bracket or end sill since the angle cock could not be rotated and held thereafter against turning by any such fixed lug or projection.

One object of my invention is to provide means for anchoring a train pipe and holding the angle cock against turning, which means are applicable to all types of car constructions and entirely independent of the presence of a fixed projection or member on the car structure or anchoring bracket which would interfere with the application of the angle cock to the train pipe after the pipe is in place.

More specifically, the object of my invention is to provide means which are detachable with respect to the anchoring bracket, which means include a lug or suitable device for engaging the nut of the angle cock to hold the latter against turning, after said means have been applied.

Another specific object of the invention is to provide a key coöperable with an anchoring bracket, which key combines the function of clamping the pipe and the function of holding the nut and angle cock against turning after the key is in place.

In the drawings forming part of this specification, Figure 1 is a side elevational view of one form of angle cock holder showing my improvements in connection therewith, a portion of a channel end sill being shown in section, and to the bottom of which the anchoring bracket is secured. Fig. 2 is an end elevational view of the structure illustrated in Fig. 1, the angle cock itself being shown in section. Fig. 3 is a detail perspective of the combined clamping and locking key shown in Figs. 1 and 2. And Fig. 4 is a view similar to Fig. 2 but illustrating a different condition encountered in a car construction where the pipe passes through a perforation in the end sill, the pipe being located above the lower edge of the end sill.

In said drawings and referring first to Figs. 1, 2 and 3, 10 denotes an end sill of a car, the end sill being shown in the form of a channel, such as is quite common in present day car constructions. To the lower flange 11 of the end sill is preferably riveted my improved depending anchoring bracket designated generally by the reference A. Coöperable with the bracket A is the improved form of key designated generally by the reference B. The train pipe is shown at 12, the angle cock proper at 13 and the standard hexagonal nut 14 usually formed integral with the angle cock proper.

The bracket A, as shown, is formed with a depending web 15 forked at its lower end so as to form two arms 16 and 17 leaving a vertically extending slot or opening 18 therebetween into which the pipe 12 may be lifted vertically until it comes to rest against integral bearings 19—19 formed on the bracket A. Where the pipe 12 fits within the bracket A, the latter is formed with a forwardly extended flange-like section 20 and the latter may be braced by a rib 21.

The depending arms 16 and 17 of the bracket are provided with vertically elongated, transversely extending slots 22 and 23 respectively, the height of said slots 22 and 23 being greater than the vertical dimension of the key B so that the latter may have a wedging action with the pipe as hereinafter explained, the key B resting on the bottom edges of the slots 22 and 23, as will be understood. The depending arm 16 of the bracket A is formed with an additional slot or opening 24 which extends parallel to or lengthwise of the pipe 12 and is open at the end nearest the angle cock, said recess or slot 24 merging with the slot 22. The purpose of this slot will be apparent hereinafter when the detailed construction of the key B is described.

The key B, as most clearly shown in Fig. 3, is of general plate formation tapered in its vertical direction from right to left as viewed in Fig. 2. As shown in said figure the lower edge 25 of the key is preferably made horizontal and the upper edge 26 sloping or inclined. At its narrower end, the key B is provided with a slot as indicated at 27, thereby forming an upper tang 28 and a lower tang 29. The lower tang 29 is shorter than the upper tang 28 and has a blunt end 30. The upper tang 28 is preferably tapered in the direction of its width so that the extreme end or tip thereof indicated at 31 is narrower than the main portion of the key B. Formed preferably integrally with the key B is a flange or lug indicated at 32 which extends horizontally when the key B is in position, said lug 32 projecting in a direction parallel to the axis of the train pipe and underneath and closely adjacent to the lower face 33 of the nut 14. The dimension of the lug 32 and its position on the key B will be made such that it substantially overlaps the entire face 33 of the nut when the key B is in proper position but will be made so that it will not engage the depending arm 17 of the bracket A when the parts are assembled.

Assuming the pipe and angle cock with its nut 14 assembled as shown in Figs. 1 and 2, within the bracket A, the key B is then inserted transversely through the slots 16 and 17 of the bracket. This may be done by using a hammer or other suitable tool so as to wedge the key B tightly against the train pipe, thus effectively clamping the latter in position. With the key in this position, the operator then bends the tang 28 with the same hammer or other suitable tool about an adjacent part of the bracket, the tang being bent approximately at the point indicated by the dotted line 128 shown in Fig. 2. By this arrangement, the key B is effectively held against accidental disengagement from the bracket. As will be evident, the slot or opening 24 in the arm 16 of the bracket will permit the lug 32 or key B to readily pass therethrough and when the key is in place, the lug 32 will either engage or be in such close proximity to the nut 14 as to effectively prevent the latter from turning, thus maintaining the angle cock in its proper position. When it is desired to remove the key, this may be accomplished by using a hammer or other suitable tool and striking the end 30 of the blunt tang 29. As will be understood by those skilled in the art, the force of the blows struck on the end 30 of the blunt tang will cause the bent tang to gradually straighten out as the key is driven from its position.

Referring to the construction shown in Fig. 4, all the parts are or may be the same as shown in Figs. 1, 2 and 3, except that the train pipe passes through the end sill 110 instead of being located below the latter. The anchor bracket A′ will, of course, be modified suitably so as to adapt it for attachment to the web of the end sill instead of to the bottom flange. In this construction, it is evident that the angle cock cannot be applied until after the pipe is extended through the end sill and the anchoring bracket A′. After the angle cock is screwed home, it is evident that the key B′ may be applied as readily as in the other constructions and will effectively clamp the pipe and at the same time hold the angle cock against turning or twisting.

From the preceding description, taken in connection with the drawing, it is evident that the arrangement which I have devised is exceedingly simple; can be applied to old or new cars of any construction regardless of the position of the train pipe with respect to the end sill; the bracket and key can be easily manufactured at relatively small expense; and the key can be applied or taken out with the simplest of tools and with minimum effort.

Although I have herein shown and described what I now consider the preferred manner of carrying out the invention, the same is merely illustrative and I contemplate such changes as come within the scope of the claims appended hereto.

I claim:

1. As an article of manufacture, a key adapted for use with pipe anchors and the like having alined slots to receive the key, said key being tapered in width in the direction of its length so as to adapt the key for wedging a pipe in position, said key being slotted lengthwise at its narrower end to thereby form two tangs, one of said tangs being shorter than the other and having a blunt end, the longer tang being bendable and adapted to be readily bent by striking same with a hammer or like tool where it projects beyond the blunt ended tang, the blunt ended tang being provided to facilitate removal of the key by striking a hammer or other suitable tool thereagainst, said key having also integral means thereon extended parallel to the axis of the pipe and adapted to engage the nut of an angle cock to prevent the latter from turning.

2. As an article of manufacture, a key adapted for use with a pipe anchor bracket having slots to receive the key, said key being tapered in width in a direction of its length and formed at its narrower end with two distinct portions separated by a longitudinally extending slot in the key, said slot extending normally within the adjacent slots of the anchor bracket when the key is in place, one of said portions having a blunt end and the other portion being tapered in thickness so as to adapt it to be bent around an adjacent portion of the bracket, said key having a lug extended laterally therefrom adapted for engagement with a nut axially alined with the pipe to prevent the nut from turning.

3. In a device of the character described, the combination with a pipe anchor bracket having an opening adapted to receive a pipe, said bracket being slotted transversely of the pipe opening to receive a key, of a key, the key having a lug extending parallel to the axis of the pipe and adapted to coöperate with the nut of an angle cock mounted on the pipe to prevent the angle cock from turning, said bracket having another slot extending lengthwise of the pipe and opening into said transverse slot and adapted to accommodate said lug when the key is applied.

4. In a device of the character described, the combination with a bracket having an opening therein to accommodate a train pipe having an angle cock thereon provided with the usual nut section, said bracket being transversely slotted, of a wedge-shaped key adapted to be extended through the slots of the bracket and coöperating with the latter to clamp the pipe in position, said key having an integral lug extended laterally therefrom parallel to the axis of the pipe, the lug being arranged to overlap one face of the nut section of the angle cock in proximity thereto when the key is in position to thereby prevent turning of the angle cock, said bracket being provided with an additional slot to accommodate passage of said lug when the key is applied.

5. In an anchoring device for a train pipe having an angle cock thereon provided with the usual nut section, the combination with a bracket provided with an opening to accommodate the pipe, said bracket being adapted to be attached to the car structure; of means for clamping said pipe in the bracket including, a key extending transversely of the pipe, said bracket being slotted to accommodate said key and permit its application and removal by sliding the same transversely of the pipe while the latter is in place within the bracket; and means arranged to hold the nut section from turning comprising, a lug extending outwardly from the bracket and parallel to the axis of the pipe so as to overlap a face of the nut section in proximity thereto, said lug being maintained rigidly in place by the key when the latter is assembled with the bracket and being removable upon removal of the key.

In witness that I claim the foregoing I have hereunto subscribed my name this 18th day of Jan., 1919.

RICHARD WEBB BURNETT.